(12) United States Patent
Wang

(10) Patent No.: US 9,349,408 B2
(45) Date of Patent: May 24, 2016

(54) HARD DISK DUPLICATION DEVICE CAPABLE OF EXPANDING DUPLICATION CAPACITY BY CHAIN CONNECTION

(71) Applicant: CHAIN-IN ELECTRONIC CO., LTD., New Taipei (TW)

(72) Inventor: Hong-Chuan Wang, New Taipei (TW)

(73) Assignee: CHAIN-IN ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 14/691,176

(22) Filed: Apr. 20, 2015

(65) Prior Publication Data

US 2015/0364150 A1     Dec. 17, 2015

(30) Foreign Application Priority Data

Jun. 13, 2014   (TW) .............................. 103210434 U

(51) Int. Cl.
*G11B 21/08* (2006.01)
*G11B 5/86* (2006.01)
*G11B 27/02* (2006.01)

(52) U.S. Cl.
CPC . *G11B 5/86* (2013.01); *G11B 27/02* (2013.01)

(58) Field of Classification Search
CPC .................... G11B 27/034; G11B 2220/2545; G11B 27/105; G11B 27/3063; G11B 2220/20; G11B 5/86; G11B 2220/90; G06F 11/1471; G06F 999/99; G06F 11/1076; G06F 11/1008; G06F 11/1456; G06F 11/2074; G06F 3/0601; H04L 41/0213; H04L 29/06
USPC ............... 369/30.19, 192.1, 30.25, 30.03, 84; 360/62, 15, 27, 79, 96.51; 711/112, 711/114, 162, 111; 714/20, 770, 820; 709/223
See application file for complete search history.

(56) References Cited

U.S. PATENT DOCUMENTS

| 6,131,141 | A | * | 10/2000 | Ravid | G06F 3/0607 360/15 |
| 6,292,852 | B1 | * | 9/2001 | Bodo | G06F 3/0626 360/15 |
| 8,036,084 | B2 | * | 10/2011 | Chang | G06F 3/0626 369/30.19 |
| 2002/0133747 | A1 | * | 9/2002 | Ravid | G06F 11/1456 714/20 |
| 2004/0141246 | A1 | * | 7/2004 | Kroening | G11B 19/122 360/15 |

* cited by examiner

*Primary Examiner* — Nabil Hindi
(74) *Attorney, Agent, or Firm* — Guice Patents PLLC

(57) ABSTRACT

A hard disk duplication device capable of expanding duplication capacity by chain connection, including one or more duplicators, the duplicator including: an expansion input connection port; an expansion output connection port; an information display screen; multiple buttons including a start button and multiple selection buttons; and at least one hard disk connection port; wherein, the chain connection is achieved by connecting the expansion output connection port of one of a plurality of the duplicators with the expansion input connection port of another of the plurality of the duplicators.

6 Claims, 8 Drawing Sheets

HARD DISK DUPLICATION DEVICE CAPABLE OF EXPANDING DUPLICATION CAPACITY BY CHAIN CONNECTION

BACKGROUND OF THE INVENTION

1. Field of the Invention

The present invention relates to a hard disk duplication device, especially to a hard disk duplication device capable of expanding duplication capacity.

2. Description of the Related Art

Conventional hard disk duplication is performed by a PC (personal computer). However, it requires a platform provided by an OS (operating system) software program, and cannot process large number of hard disks at a time.

Besides, to meet clients' different requirements of different number of hard disks to be processed at a time, the hard disk duplication device manufacturers may have to prepare different specs. For example, assuming the required number of hard disks to be processed at a time for client A is 50 and the required number of hard disks to be processed at a time for client B is 100, then a manufacturer will have to prepare two different specs of hard disk duplication devices. However, to meet the requirements of a variety of specs, the manufacturing cost will increase substantially.

To solve the foregoing problem, a novel hard disk duplication device is needed.

SUMMARY OF THE INVENTION

One objective of the present invention is to disclose a hard disk duplication device capable of expanding duplication capacity by chain connection, so as to easily meet different specs requirements of processing different number of hard disks at a time.

Another objective of the present invention is to disclose a hard disk duplication device capable of copying the contents of a source hard disk to multiple hard disks at a time.

Another objective of the present invention is to disclose a hard disk duplication device capable of comparing the contents of a source hard disk with the contents of cloned hard disks to ensure the accuracy of duplication.

Still another objective of the present invention is to disclose a hard disk duplication device capable of independently performing duplication operation without the need of PC's support.

To attain the foregoing objectives, a hard disk duplication device capable of expanding duplication capacity by chain connection is proposed, including:

an expansion input connection port;
an expansion output connection port;
an information display screen;
multiple buttons including a start button and multiple selection buttons;
at least one hard disk connection port; and
a printed circuit board, including a processor, a memory, a display interface, an expansion interface, a button circuit, and at least one hard disk control circuit, wherein the memory, the display interface, the expansion interface, the button circuit, and the at least one hard disk control circuit are coupled with the processor;

wherein, the memory has a duplication data storage section for storing duplication data, the information display screen is coupled with the display interface, the multiple buttons are coupled with the button circuit, the at least one hard disk connection port is coupled with the at least one hard disk control circuit, and both the expansion input connection port and the expansion output connection port are coupled with the expansion interface to receive the duplication data via the expansion input connection port and/or output the duplication data via the expansion output connection port.

In one embodiment, the duplication data is from a source hard disk.

In one embodiment, the information display screen is implemented by a liquid crystal display.

In one embodiment, the multiple selection buttons are provided for a user to selectively press to determine a data duplication procedure.

In one embodiment, the hard disk duplication device capable of expanding duplication capacity by chain connection further includes multiple light indicators.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
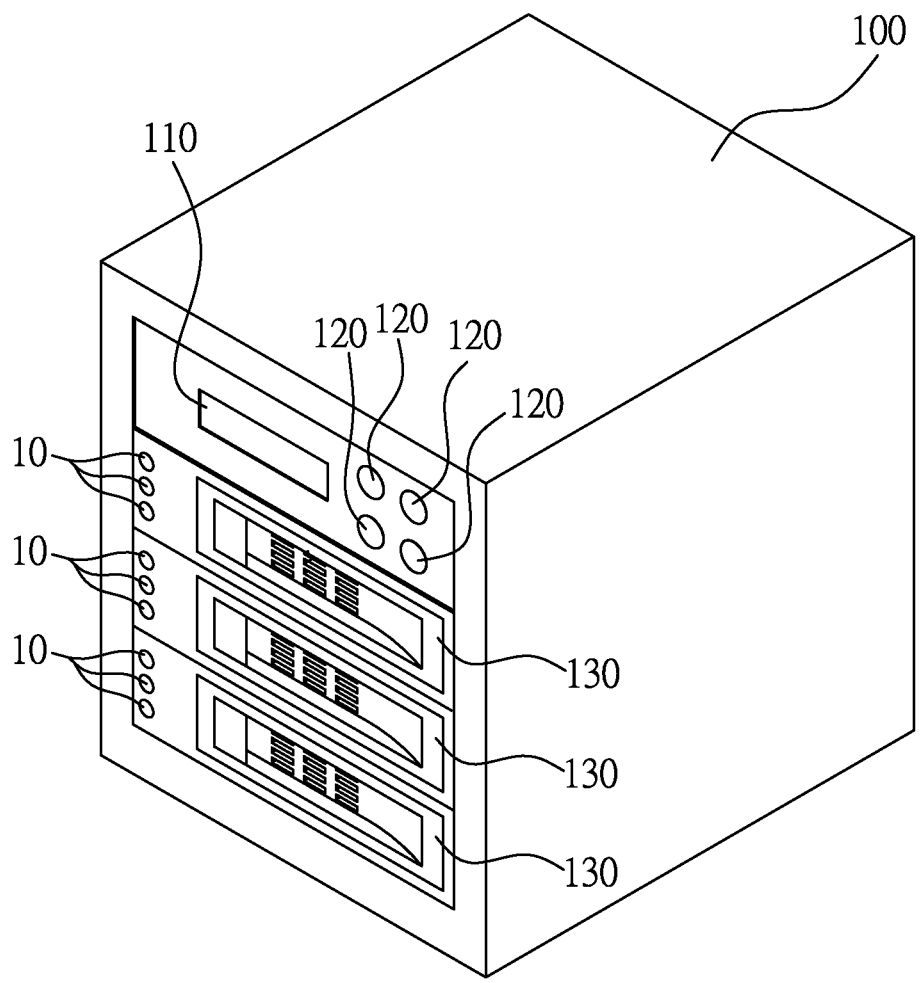
FIG. 1 illustrates a front view of a hard disk duplicator according to a preferred embodiment of the present invention.
Figure 2:
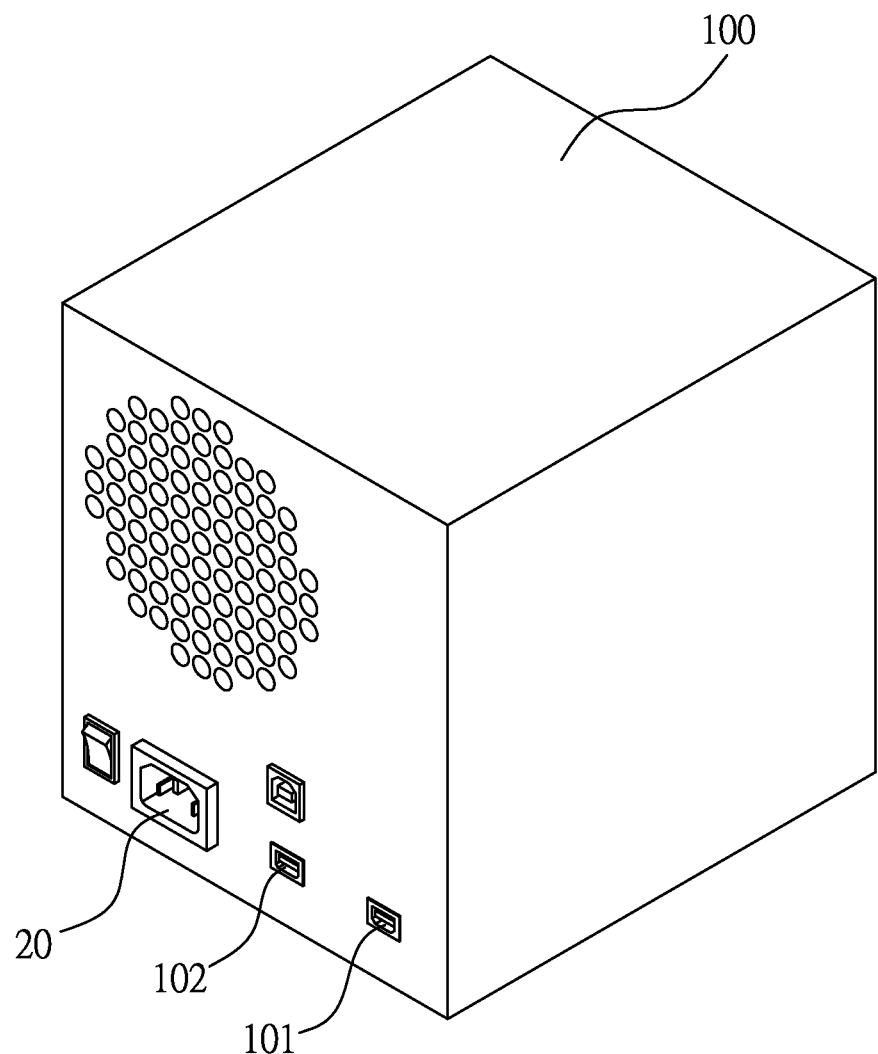
FIG. 2 illustrates a back view of the hard disk duplicator of FIG. 1.
Figure 3:
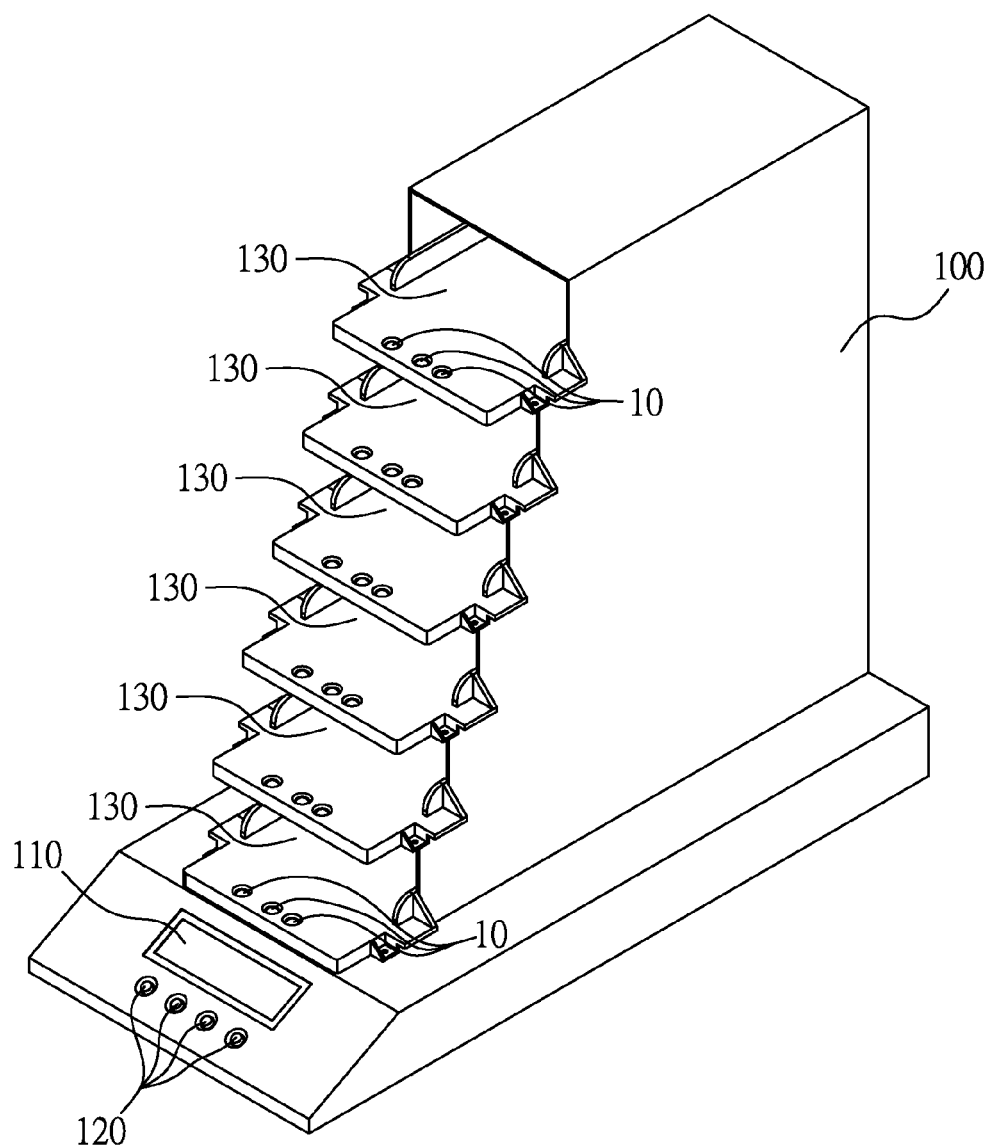
FIG. 3 illustrates a front view of a hard disk duplicator according to another preferred embodiment of the present invention.
Figure 4:
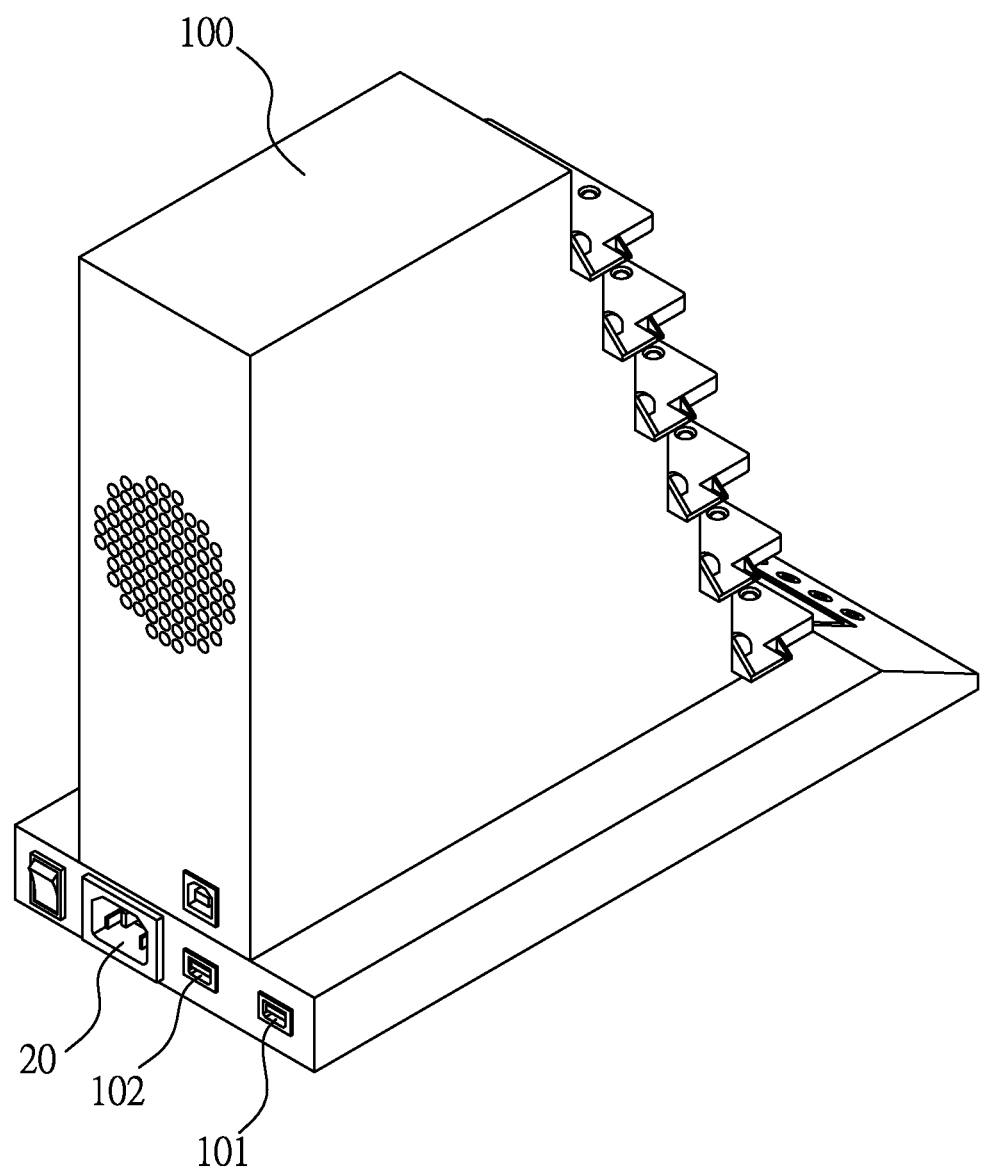
FIG. 4 illustrates a back view of the hard disk duplicator of FIG. 3.

Please refer to FIGS. 1-2, which illustrate a front view and a back view of a hard disk duplicator according to a preferred embodiment of the present invention; and FIGS. 3-4, which illustrate a front view and a back view of a hard disk duplicator according to another preferred embodiment of the present invention. As illustrated in FIGS. 1-2 or FIGS. 3-4, the hard disk duplicator includes a case 100, an expansion input connection port 101, an expansion output connection port 102, an information display screen 110, multiple buttons 120, multiple hard disk connection ports 130, multiple light indicators 10, and a power connection port 20.

Figure 5:
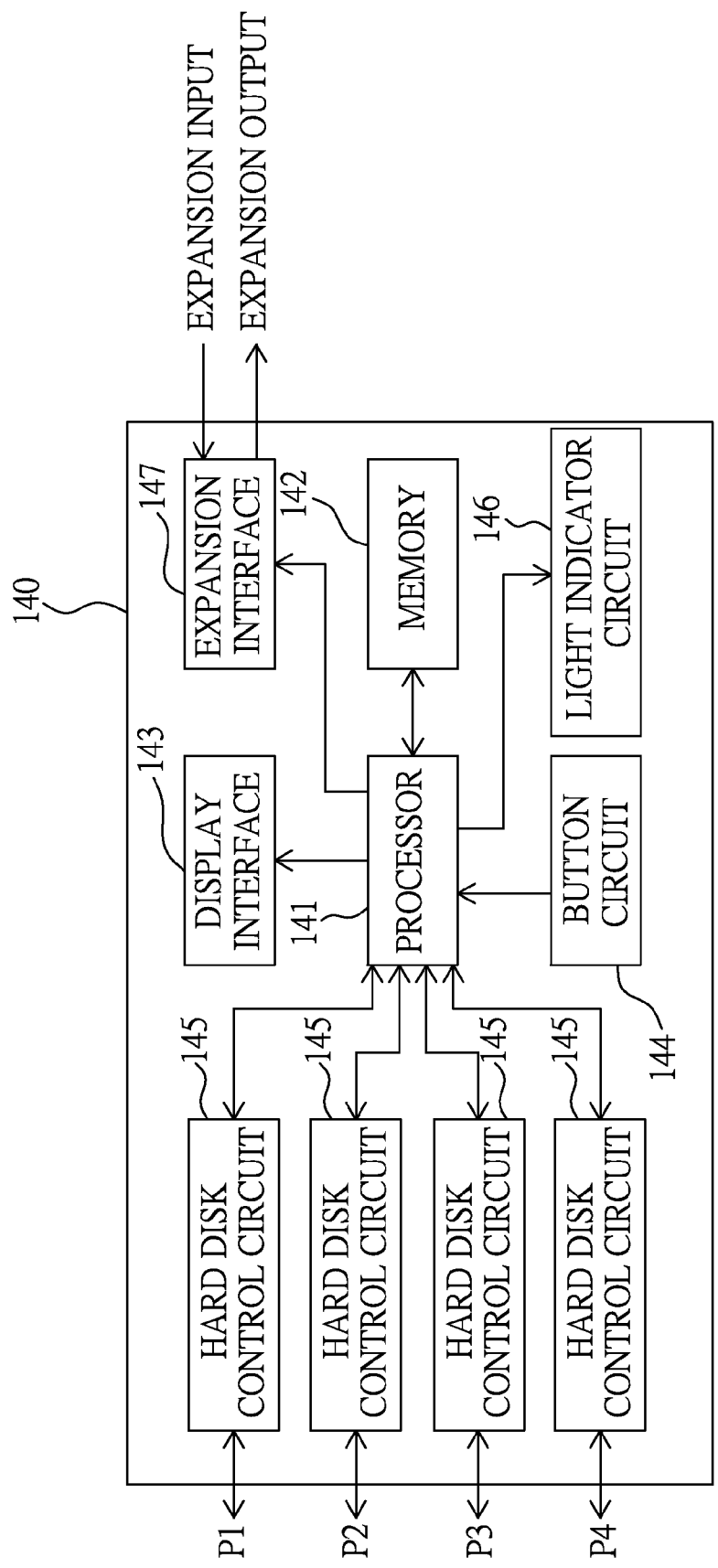
FIG. 5 illustrates a block diagram of a circuit implemented on a printed circuit board of the hard disk duplicator of the present invention.

The case 100 has a printed circuit board installed inside (not illustrated in the figure). Please refer to FIG. 5, which illustrates a block diagram of a circuit 140 implemented on the printed circuit board. As illustrated in FIG. 5, the circuit 140 includes a processor 141, a memory 142, a display interface 143, a button circuit 144, multiple hard disk control circuits 145, a light indicator circuit 146, and an expansion interface 147, wherein the memory 142, the display interface 143, the button circuit 144, the multiple hard disk control circuits 145, the light indicator circuit 146, and the expansion interface 147 are coupled with the processor 141.

In the circuit 140, the memory 142 has a duplication data storage section for storing duplication data from a source hard disk; the display interface 143 is coupled with the information display screen 110 for displaying operation information, and the information display screen 110 can be implemented by a liquid crystal display; the button circuit 144 is coupled with the multiple buttons 120 to generate button signals in response to a user's pressing operation; the multiple hard disk control circuits 145 are coupled with the multiple hard disk connection ports 130 so as to copy the duplication data to the hard disks connected with the multiple hard disk connection ports 130; the light indicator circuit 146 is coupled with the multiple light indicators 10 to display operation status; and the expansion interface 147 is coupled with both the expansion input connection port 101 and the expansion output connection port 102 so as to receive the duplication data via the expansion input connection port 101 and/or output the duplication data via the expansion output connection port 102.

The multiple buttons 120 include a start button and multiple selection buttons, wherein, the multiple selection buttons are provided for a user to selectively press to determine an operation procedure—a data duplication procedure for multiple hard disks at a time, for example; and the start button is provided for a user to press to perform a selected operation procedure—the data duplication procedure for multiple hard disks at a time, for example.

Figure 6:
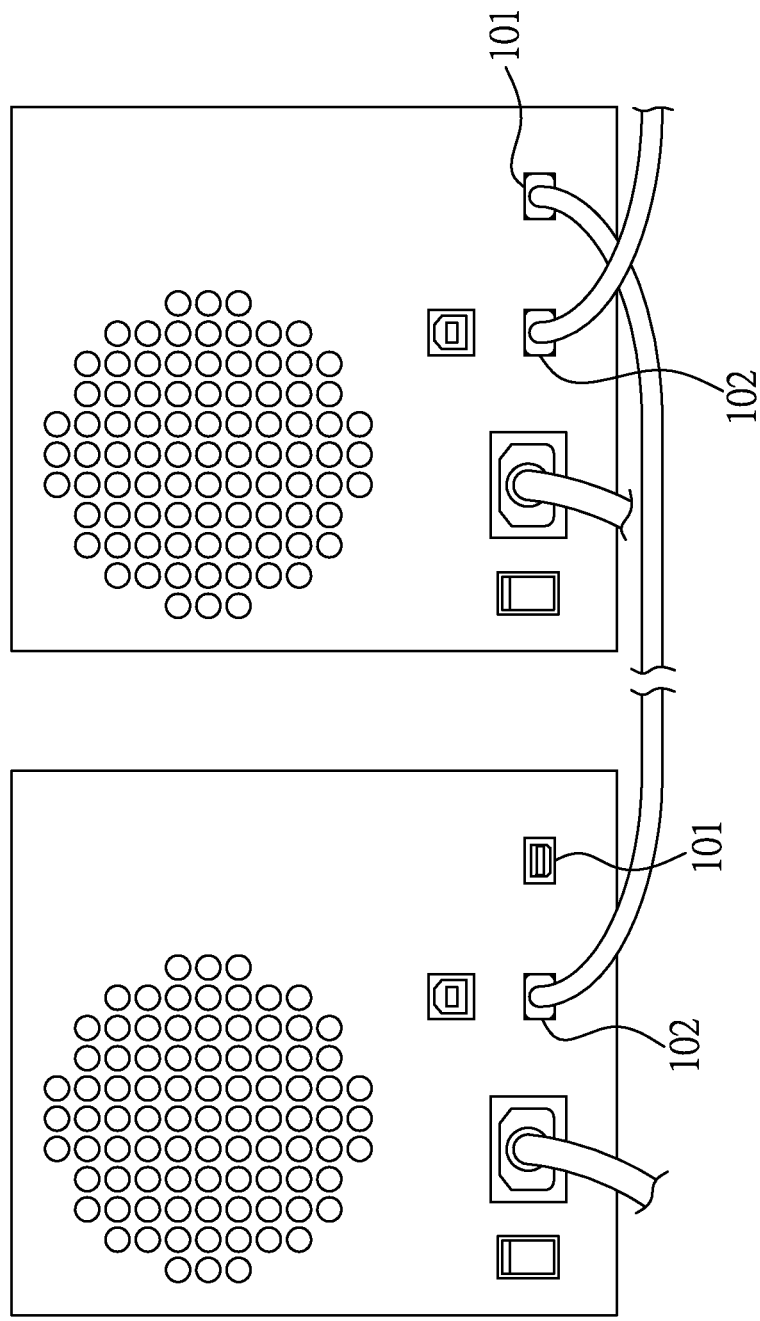
FIG. 6 illustrates an expansion scenario of a hard disk duplication device of the present invention.

Please refer to FIG. 6, which illustrates an expansion scenario of a hard disk duplication device of the present invention. As illustrated in FIG. 6, the expansion input connection port 101 of the hard disk duplicator at left side is left open and the expansion output connection port 102 thereof is connected to the expansion input connection port 101 of the hard disk duplicator at right side, making the hard disk duplicator at left side a master device and the hard disk duplicator at right side a slave device. The expansion output connection port 102 of the slave device can be connected to the expansion input connection port 101 of another slave device to expand the duplication capacity.

Figure 7:
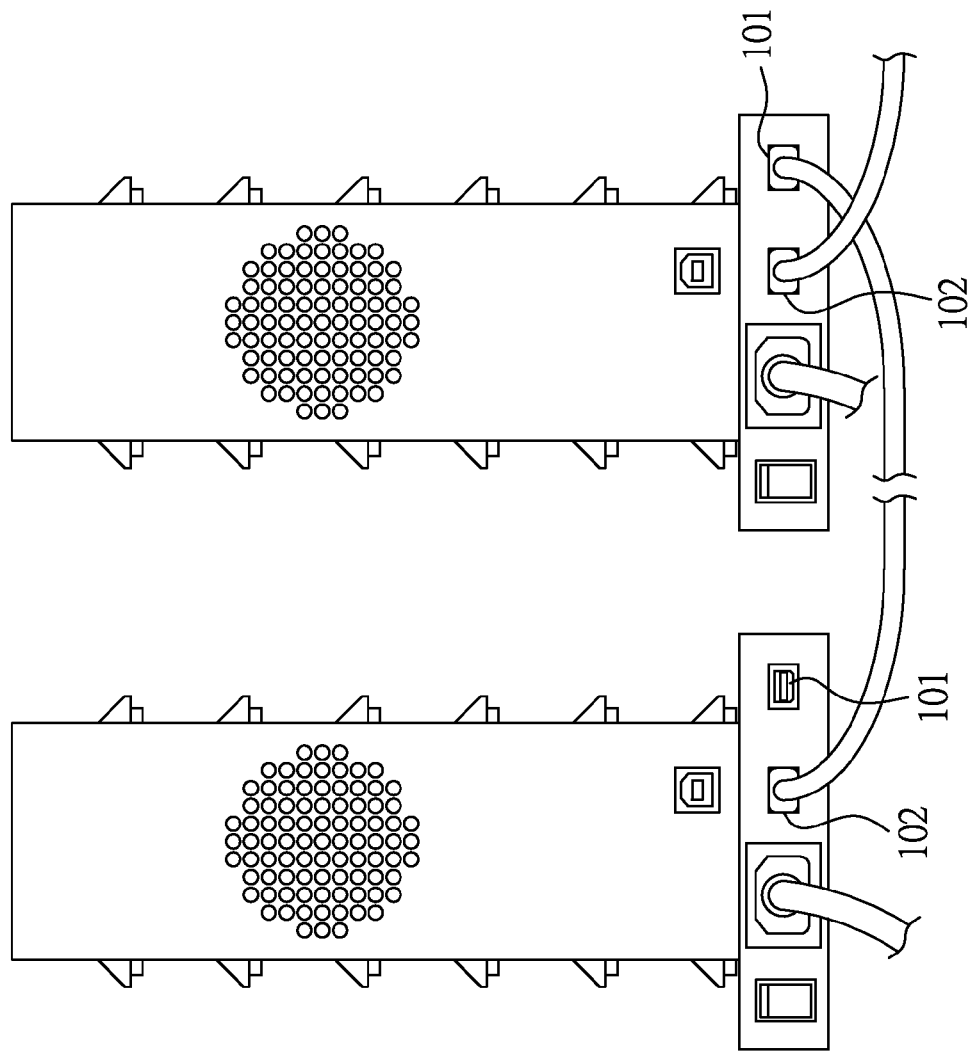
FIG. 7 illustrates another expansion scenario of a hard disk duplication device of the present invention.

Please refer to FIG. 7, which illustrates another expansion scenario of a hard disk duplication device of the present invention. As can be seen in FIG. 7, the expansion connection thereof is same as that of FIG. 6 that, the expansion input connection port 101 of the hard disk duplicator at left side is left open and the expansion output connection port 102 thereof is connected to the expansion input connection port 101 of the hard disk duplicator at right side, making the hard disk duplicator at left side a master device and the hard disk duplicator at right side a slave device, and the expansion output connection port 102 of the slave device can be connected to the expansion input connection port 101 of another slave device to expand the duplication capacity.

Figure 8:
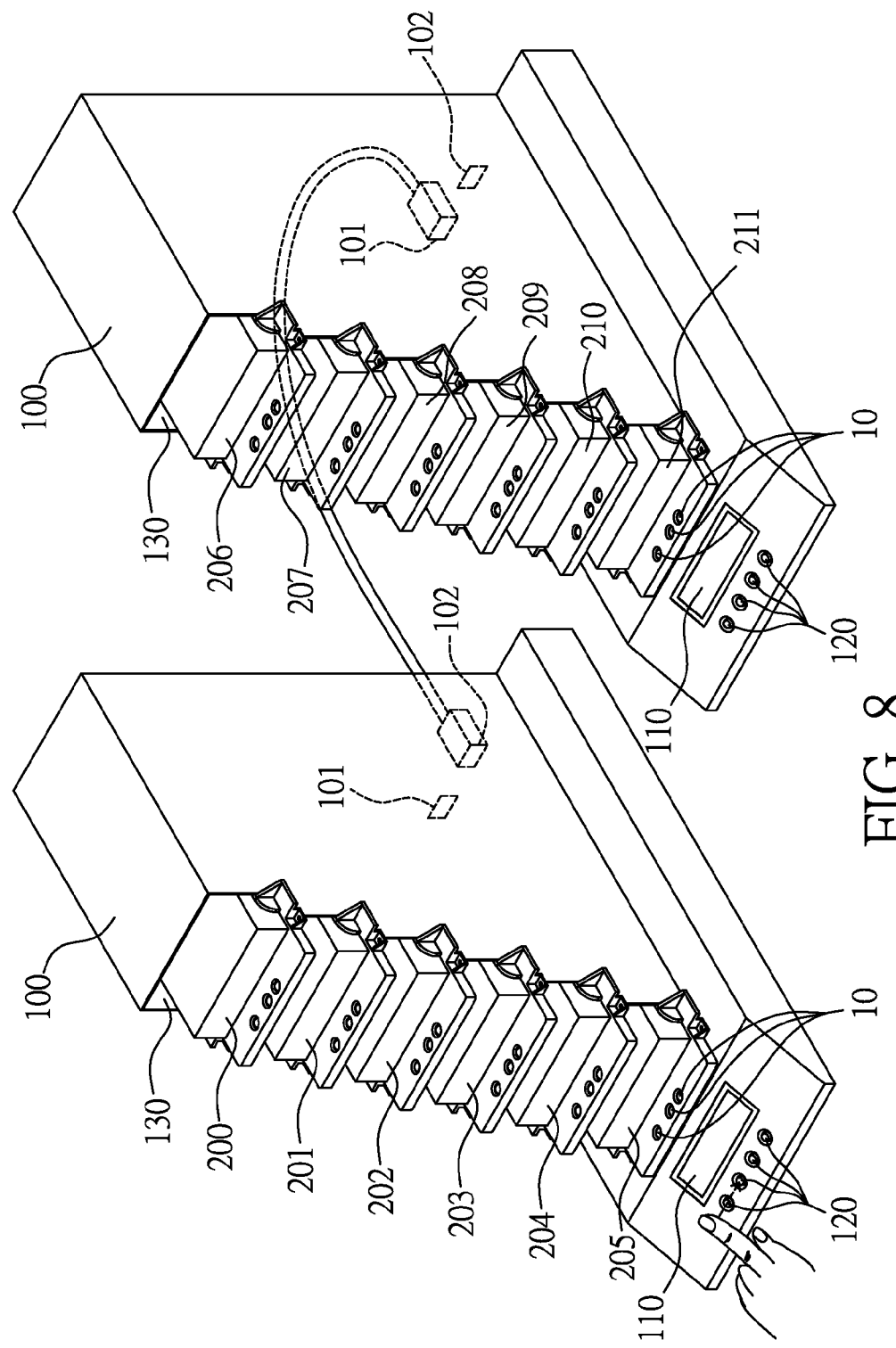
FIG. 8 illustrates an operation scenario of a hard disk duplication device of the present invention.

Please refer to FIG. 8, which illustrates an operation scenario of a hard disk duplication device of the present invention. As illustrated in FIG. 8, after completing the expansion connection between a master device and a slave device, by selectively pressing the multiple selection buttons and pressing the start button, data for duplication in a source hard disk 200 (connected with one of the multiple hard disk connection ports of the master device) can be copied to the other hard disks 201-205 of the master device, and can be transmitted to the slave device and copied to the hard disks 206-211 thereof.

In addition, the hard disk duplication device of the present invention can also perform a data comparison procedure to ensure the accuracy of data duplication.

In addition, as the functions of the present invention can be realized by firmware, therefore, the hard disk duplicator of the present invention is capable of independently performing duplication operation without the need of PC's support.

In addition, apart from hard disk, the design of the hard disk duplicator of the present invention is also applicable to data duplication of SSD (solid state drive).

Thanks to the novel designs disclosed above, the present invention possesses the advantages below:

1. The hard disk duplication device of the present invention is capable of expanding duplication capacity by chain connection to easily meet different specs requirements of processing different number of hard disks at a time.

2. The hard disk duplication device of the present invention is capable of copying the contents of a source hard disk to multiple hard disks at a time.

3. The hard disk duplication device of the present invention is capable of comparing the contents of a source hard disk with the contents of cloned hard disks to ensure the accuracy of duplication.

4. The hard disk duplication device of the present invention is capable of independently performing duplication operation without the need of PC's support.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A hard disk duplication device capable of expanding duplication capacity by chain connection, comprising:
    a case having an expansion input connection port, an expansion output connection port, an information display screen, multiple buttons, at least one hard disk connection port, a printed circuit board;
    said expansion input connection port being located on an exterior of said case;
    said expansion output connection port being located on an exterior of said case;
    said multiple buttons including a start button and multiple selection buttons; and
    said printed circuit board, including a processor, a memory, a display interface, an expansion interface, a button circuit, and at least one hard disk control circuit, wherein said memory, said display interface, said expansion interface, said button circuit, and said at least one hard disk control circuit are coupled with said processor;
    wherein, said memory has a duplication data storage section for storing duplication data, said information display screen is coupled with said display interface, said multiple buttons are coupled with said button circuit, said at least one hard disk connection port is coupled with said at least one hard disk control circuit, and both said expansion input connection port and said expansion output connection port are coupled with said expansion interface to receive said duplication data via said expansion input connection port and/or output said duplication data via said expansion output connection port;

wherein said at least one hard disk connection port includes multiple hard disk connection ports positioned in said case in a stair step configuration with an end of a higher hard disk connection port of said multiple hard disk connection ports being set back from an end of a lower hard disk connection port of said multiple hard disk connection ports.

2. The hard disk duplication device capable of expanding duplication capacity by chain connection as disclosed in claim 1, wherein said duplication data is from a source hard disk.

3. The hard disk duplication device capable of expanding duplication capacity by chain connection as disclosed in claim 1, wherein said information display screen is implemented by a liquid crystal display.

4. The hard disk duplication device capable of expanding duplication capacity by chain connection as disclosed in claim 1, wherein said multiple selection buttons are provided for a user to selectively press to determine a data duplication procedure.

5. The hard disk duplication device capable of expanding duplication capacity by chain connection as disclosed in claim 1, further comprising multiple light indicators.

6. A hard disk duplication device having multiple duplicators and capable of expanding duplication capacity by chain connection, each of the duplicators comprising:

a case having an expansion input connection port, an expansion output connection port, an information display screen, multiple buttons, and at least one hard disk connection port;

said expansion input connection port being located on an exterior of said case;

said expansion output connection port being located on an exterior of said case; and said multiple buttons including a start button and multiple selection buttons;

wherein, said multiple duplicators are connected with one another by connecting said expansion output connection port of one of said multiple duplicators with said expansion input connection port of another of said multiple duplicators;

wherein said at least one hard disk connection port includes multiple hard disk connection ports positioned in said case in a stair step configuration with an end of a higher hard disk connection port of said multiple hard disk connection ports being set back from an end of a lower hard disk connection port of said multiple hard disk connection ports.

\* \* \* \* \*